(12) United States Patent
Cho et al.

(10) Patent No.: US 6,372,386 B1
(45) Date of Patent: Apr. 16, 2002

(54) ELECTRODE ACTIVE MATERIAL AND POLYMER ELECTROLYTE MATRIX COMPOSITION FOR LITHIUM ION POLYMER BATTERY

(75) Inventors: Hun-goo Cho, Asan; Whan-jin Roh, Seoul, both of (KR)

(73) Assignee: Samsung Display Devices Co., Ltd., Suwon (KR)

( * ) Notice: Subject to any disclaimer, the term of this patent is extended or adjusted under 35 U.S.C. 154(b) by 0 days.

(21) Appl. No.: 09/370,214

(22) Filed: Aug. 9, 1999

(30) Foreign Application Priority Data

Nov. 5, 1998 (KR) .............................. 98-47289

(51) Int. Cl.$^7$ .............................. H01M 4/58; H01M 4/60
(52) U.S. Cl. .................. 429/231.95; 429/212; 429/213; 429/216; 429/231.9
(58) Field of Search .................. 429/212, 231.95, 429/231.9, 213, 218.1, 216

(56) References Cited

U.S. PATENT DOCUMENTS

| | | | |
|---|---|---|---|
| 5,707,760 A | * 1/1998 | Stux et al. .................. 429/188 |
| 5,928,812 A | * 7/1999 | Xue ........................... 429/304 |
| 6,054,230 A | * 4/2000 | Kato ........................... 429/33 |
| 6,150,053 A | * 11/2000 | Murata et al. ........... 429/218.1 |

FOREIGN PATENT DOCUMENTS

JP 11-154415 * 6/1998

* cited by examiner

*Primary Examiner*—Stephen Kalafut
*Assistant Examiner*—Julian A. Mercado
(74) *Attorney, Agent, or Firm*—Leydig, Voit, & Mayer, Ltd.

(57) ABSTRACT

An electrode active material composition containing a pyrolytic plasticizer, a polymer electrolytic matrix composition and a preparation method of a lithium ion polymer battery using the same are provided. Since a separate plasticizer extraction step using an organic solvent is not necessary, the preparation cost is reduced and the preparation process can be kept clean. In particular, since a uniform porosity plate can be fabricated after removing the plasticizer, a lithium ion polymer battery with improved high-rate charge and discharge characteristics can be prepared.

12 Claims, No Drawings

ELECTRODE ACTIVE MATERIAL AND POLYMER ELECTROLYTE MATRIX COMPOSITION FOR LITHIUM ION POLYMER BATTERY

BACKGROUND OF THE INVENTION

1. Field of the Invention

The present invention relates to an electrode active material composition for a lithium (Li) ion polymer battery, a polymer electrolyte matrix composition and a method for preparing an Li ion polymer battery using the same, and more particularly, to an electrode active material composition for an Li ion polymer battery, a polymer electrolyte matrix composition, an Li ion polymer battery with improved high-rate charge and discharge characteristics while keeping a clean preparation process by obviating the need for a plasticizer extraction step using an organic solvent and a preparation method thereof using the same.

2. Description of the Related Art

A secondary lithium battery is classified into a lithium ion battery and a lithium ion polymer battery according to materials used as its anode and cathode materials.

In the lithium ion battery, electricity is generated such that lithium ions move between a cathode and an anode. The lithium ion battery has a higher discharge voltage and better charge/discharge cycle characteristics than a conventional nickel cadmium battery or nickel hydrogen battery, and there is no environmental pollution.

The lithium ion polymer battery uses a solid electrolyte such as a polymer, unlike the lithium ion battery using a liquid electrolyte. Thus, the lithium ion polymer battery is lighter and has a smaller volume than the lithium ion battery, and its discharge rate is very low.

In a conventional lithium ion battery, an electrode is fabricated by coating an active material composition on a metal thin film. However, a loss in the active material composition is generated during a fabrication process, resulting in unsatisfactory utilization efficiency of the active material composition.

A lithium ion polymer battery is fabricated by forming a film with an electrode active material composition containing an active material, a conductive agent, a binder and a solvent in a casting method, and then fusing the film onto a current collector at a predetermined temperature and pressure.

In the lithium ion polymer battery, a solid polymer electrolyte is generally used. The polymer electrolyte is divided into three types, a pure solid polymer electrolyte, a gel polymer electrolyte and a hybrid polymer electrolyte. Here, the hybrid polymer electrolyte is formed by filling an electrolytic solution into a porous polymer matrix, from which the electrolytic solution does not leak.

In the lithium ion polymer battery employing the above-described hybrid polymer electrolyte, to enhance the operational efficiency by forming pores for electrolytic solution injection and providing flexibility to an electrode plate, a method for adding a plasticizer to an electrode active material composition has been proposed. Dibutyl phthalate is generally used as the plasticizer, which must be removed prior to the step of battery assembly. The most widely used method for removing the plasticizer is an extraction method using an organic solvent such as ether.

However, the extraction method for removing the plasticizer is complicated, dangerous and environmentally harmful.

SUMMARY OF THE INVENTION

To solve the above problems, it is an objective of the present invention to provide an electrode active material composition for a lithium ion polymer battery using a pyrolytic plasticizer, in which a separate plasticizer extraction step using an organic solvent is not necessary, and by which high-rate charge and discharge characteristics are improved.

It is another objective of the present invention to provide a polymer electrolyte matrix composition using a pyrolytic plasticizer, in which a separate plasticizer extraction step using an organic solvent is not necessary, and by which high-rate charge and discharge characteristics are improved.

It is still another objective of the present invention to provide a preparation method of a lithium ion polymer battery using a pyrolytic plasticizer, in which a separate plasticizer extraction step using an organic solvent is not necessary, and by which high-rate charge and discharge characteristics are improved.

Accordingly, to achieve the first objective of the present invention, there is provided an electrode active material composition for a lithium ion polymer battery having an electrode active material, a conductive agent, a plasticizer and a binder, wherein the plasticizer is a pyrolytic plasticizer and the content thereof is in the range of 5 to 30% by weight based on the total weight of the electrode active material composition.

To achieve the second objective of the present invention, there is provided a polymer electrolyte matrix composition having a polymer resin and a plasticizer, wherein the plasticizer is a pyrolytic plasticizer and the content thereof is in the range of 10 to 60% by weight based on the total weight of the polymer electrolyte matrix composition.

To achieve the third objective of the present invention, there is provided a method for preparing a lithium ion polymer battery including the steps of (a) mixing an electrode active material, a conductive agent, a binder and a plasticizer to prepare an electrode active material composition, casting the same on a current collector, drying the resultant structure to form an electrode plate, (b) mixing a plasticizer with a polymer resin to form a polymer electrolyte matrix composition, casting the prepared composition and drying the same to form a polymer electrolyte, (c) laminating the electrode plates and the polymer electrolyte and thermally treating the same at a temperature of 60 to 150° C. to fabricate an electrode structure, and (d) injecting an electrolyte containing an organic non-aqueous solvent and a lithium salt into the electrode structure, wherein the plasticizer for the electrode active material composition in step (a) and/or the plasticizer for the polymer electrolyte matrix composition in step (b) are a pyrolytic plasticizer, the content of the pyrolytic plasticizer in step (a) is in the range of 5 to 30% by weight based on the total weight of the electrode active material composition, and content of the pyrolytic plasticizer in step (b) is in the range of 10 to 60% by weight based on the total weight of the polymer electrolyte matrix composition.

As the pyrolytic plasticizer, any material capable of increasing plasticity at a temperature in the range of 60 to 150° C. can be used. In particular, the pyrolytic plasticizer is preferably ammonium bicarbonate, an alkali metal carbonate or an alkali earth metal carbonate, and is preferably at least one selected from the group consisting of ammonium bicarbonate, sodium hydrogencarbonate ($NaHCO_3$), potassium hydrogencarbonate ($KHCO_3$), lithium hydrogencarbonate ($LiHCO_3$), lithium carbonate ($Li_2CO_3$) and calcium carbonate ($CaCO_3$).

DESCRIPTION OF THE PREFERRED EMBODIMENTS

The feature of the present invention lies in that an electrode active material composition and/or a polymer electrolyte matrix composition include a pyrolytic plasticizer. The pyrolytic plasticizer is pyrolyzed at 80 to 150° C. to be removed. If the pyrolytic plasticizer is added to at least one of the electrode active material composition and/or a polymer electrolyte matrix composition, the flexibility and adhesiveness between the electrode and the polymer matrix are improved, thereby facilitating lamination of the electrode and electrolyte and enhancing the performance of the battery. Also, unlike the case of using the conventional plasticizer such as dibutyl phthalate, the extraction process using an organic solvent is not necessary, thereby keeping a clean preparation process.

The pyrolytic plasticizer is preferably ammonium bicarbonate, an alkali metal carbonate or an alkali earth metal carbonate and at least one of the following compounds: ($KHCO_3$), sodium hydrogencarbonate ($NaHCO_3$), potassium hydrogencarbonate ($KHCO_3$), lithium hydrogencarbonate ($LiHCO_3$), lithium carbonate ($Li_2CO_3$) and calcium carbonate ($CaCO_3$).

In the case when the pyrolytic plasticizer of the present invention is added to only one of the electrode active material composition and the polymer electrolyte matrix composition, any conventional plasticizer for use in the lithium ion polymer battery can be used for the other composition. Preferably, the pyrolytic plasticizer is included in both the electrode active material composition and the polymer electrolyte matrix composition.

The content of the plasticizer is preferably in the range of 5 to 30% by weight based on the total weight of the electrode active material composition or the composition for forming a polymer matrix, preferably 10 to 25% by weight. If the content of the plasticizer is less than 5% by weight, enhancement in high-rate charge and discharge characteristics is negligible. If the content of the plasticizer is greater than 30% by weight, the content of an electrode active material in the electrode active material composition is relatively reduced, which is not desirable in view of the capacity of the battery.

The content of the plasticizer is preferably in the range of 10 to 60% by weight based on the total weight of the electrode active material composition or the composition for forming a polymer matrix, preferably 30 to 50% by weight. If the content of the plasticizer is less than 10% by weight, the content of impregnated electrolytic solution is decreased. If the content of the plasticizer is greater than 60% by weight, the tensile strength of the electrolyte is weak, which is not desirable in view of a quality of the battery.

The electrode active material composition of the present invention includes the pyrolytic plasticizer, electrode active material, a conductive agent and a binder. A deflocculation agent such as sodium molybdate may be further provided. In the case of adding the deflocculation agent, dispersion efficiency of the composition can be enhanced.

The active material typically used in the lithium ion polymer battery can be employed as the electrode active material. In detail, the cathode active material includes $LiMn_2O_4$, $LiNiO_2$ or $LiCoO_2$, and the anode active material includes carbon or graphite.

As the conductive agent of the present invention, carbon black can be used. As the binder, at least one selected from the group consisting of polyvinyl alcohol, methyl cellulose, carboxymethyl cellulose, polyethylene glycol and fluorocarbon resin such as polyvinylidene fluoride, can be used.

Even though the solvents are not described in the electrode active material composition due to the convenience of calculating the plasticizer's content, the electrode active material composition includes substantial amounts of solvents. As the solvent, N-menthyl-2-pyrrolidene (NMP), acetone and mixtures thereof, preferably, a mixed solvent containing NMP and acetone in a volumetric ratio of 10:90 to 90:10, can be used. Also, the content of the solvents is variable.

The contents of the electrode active material, conductive agent, binder and deflocculation agent constituting the electrode active material composition are in the range of conventional levels.

The composition for forming the polymer electrolyte matrix of the present invention includes a polymer resin, a plasticizer and a solvent. Even though the solvents are not described in the above composition due to the convenience of calculating the plasticizer's content, the electrode active material composition includes substantial amounts of solvents.

As the polymer resin, every conventional compound used for the polymer matrix can be used. Specifically, a compound having a network structure capable of occluding a large amount of an electrolytic solution is preferable. In detail, the polymer resin includes polyvinylidene fluoride, polyhexafluoroisobutylene or vinylidene fluoride-hexafluoroisobutylene copolymer.

In some cases, the composition for the polymer matrix may further comprise a deflocculation agent and/or a ceramic filler.

Even though the solvents are not described in the polymer electrolyte matrix composition due to the convenience of calculating the plasticizer's content, the composition includes substantial amounts of solvents. The solvent may be the same as that used in the electrode active material composition.

The ceramic filler is used for improving the mechanical strength of the electrolyte and is at least one selected from the group consisting of silica, alumina, lithium aluminate and zeolite. The content of the ceramic filler is in the range of a conventional level.

Hereinafter, a method for preparing a lithium ion polymer battery according to the present invention will be described.

First, an electrode active material and a conductive agent are mixed. A binder, a solvent and a plasticizer are added to the mixture and then mixed sufficiently to prepare an electrode active material composition. Here, the plasticizer is preferably a pyrolytic plasticizer and the content thereof is preferably in the range of 5 to 30% by weight based on the total weight of the electrode active material composition. Also, a deflocculation agent may be further added to the electrode active material composition.

Subsequently, the electrode active material composition is cast on a current collector to a thickness of 50 to 200 $\mu$m. Then, the cast resultant material is dried to fabricate an electrode plate.

Separately, a polymer resin, a solvent and a plasticizer are mixed sufficiently to prepare a composition for forming a polymer matrix. Here, the plasticizer is preferably a pyrolytic plasticizer and the content thereof is preferably in the range of 10 to 60% by weight based on the total weight of the polymer electrolyte matrix composition. Also, a ceramic filler and a deflocculation agent may be further added to the polymer electrolyte matrix composition.

Thereafter, the composition for forming the polymer electrolyte matrix is cast on a support body, for example, a polyethylene terephthalate film, and then dried. Subsequently, a polymer matrix film is stripped off the support body to form a polymer electrolyte.

In drying the electrode and the polymer matrix, the drying conditions differ depending on the solvent system used. Here, it is preferred that the drying conditions are appropriately controlled to leave a solvent content of 5 to 20% by weight, compared to the initial solvent content. This is for allowing the remaining solvent of a predetermined amount to serve to assist various components in the composition in being combined, thereby improving the operational efficiency in laminating the electrode and the polymer electrolyte and enhancing the performance of the battery.

Then, the electrode plate and the polymer electrolyte are laminated and then thermally treated at a temperature of 60 to 150° C. to pyrolyze the plasticizer contained in the electrode and the polymer matrix to then be removed, thereby forming the electrode structure. Here, if the temperature of the thermal treatment is lower than 60° C., it is difficult to completely remove the plasticizer. If it is higher than 150° C., deformation of an additive such as the binder constituting the electrode active material composition may be caused, or the polymer matrix may be deteriorated, both of which are not desirable.

Subsequently, an electrolytic solution is injected into the electrode structure, thereby completing the lithium ion polymer battery. Here, the electrolytic solution includes a non-aqueous organic solvent and a lithium salt.

As the non-aqueous solvent, at least one solvent selected from the group consisting of propylene carbonate (PC), ethylene carbonate (EC), γ-butyrolactone, 1,3-dioxolane, dimethyoxyethane, diethylcarbonate, tetrahydrofuran (THF), dimethylsulfoxide and polyethyleneglycol dimethylether. The content of the non-aqueous solvent is in the range of that conventionally used in the solid polymer electrolyte.

The lithium salt is not specifically limited but any lithium compound which can emit lithium ions after being dissociated in the organic solvent is used, and detailed examples thereof include lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonylamide ($LiN(CF_3SO_2)_2$). If the organic electrolytic solution containing such a lithium salt is injected into the polymer matrix, it acts as the path for moving lithium ions in a current direction. The content of the lithium salt is in the range of that conventionally used in the solid polymer electrolyte.

The injection process of the electrolytic solution into the electrode structure is preferably performed under a vacuum atmosphere, which is because the electrolyte injection time can be reduced and the electrolyte injection amount can be maximized under this atmosphere.

Hereinafter, the present invention will be described in detail through the following examples.

EXAMPLE 1

50 g of $LiCoO_2$ and 10 g of carbon black were mixed, 15 g of polyvinylidene fluoride, 100 g of NMP, 400 g of acetone and 20 g of ammonium bicarbonate were added thereto and then mixed sufficiently to prepare a cathode slurry composition.

The cathode slurry composition was cast on an expanded aluminum metal having a thickness of 50 μm, and then dried in heated-air at 50° C. for 5 minutes to prepare a cathode plate. Here, the content of NMP was controlled to be in the range of 5 to 20% by weight based on the initial content thereof.

Separately, 50 g of graphite, 10 g of carbon black, 15 g of polyvinylidene fluoride, 100 g of NMP, 400 g of acetone and 25 g of ammonium bicarbonate were sufficiently mixed to prepare an anode slurry composition.

The anode slurry composition was cast on an expanded copper metal having a thickness of 50 μm, and then dried in heated-air at 100° C. for 5 minutes to prepare an anode plate. Here, the content of NMP was controlled to be in the range of 5 to 20% by weight based on the initial content thereof.

A hybrid polymer electrolyte was prepared such that 60 g of polyvinylidene fluoride, 60 g of silica, 200 g of NMP, 800 g of acetone and 100 g of ammonium bicarbonate were mixed, cast on a polyethylene terephthalate (PET) film and dried at 50° C. for 5 minutes to prepare a polymer matrix. Subsequently, the polymer matrix was stripped off the PET film to prepare a polymer electrolyte.

The cathode plate, the polymer electrolyte and the anode plate were laminated and then dried in heated-air at 80° C. for 1 hour. Thereafter, the resultant is thermally treated at 80° C. for about 6 hours under a vacuum atmosphere, thereby fabricating an electrode structure.

The electrode structure was immersed in the electrolytic solution under a vacuum atmosphere, thereby completing a lithium ion polymer battery. Here, the electrolytic solution was prepared by dissolving $LiPF_6$ in a mixed organic solvent of ethylene carbonate and dimethyl carbonate.

EXAMPLE 2

A lithium ion polymer battery was prepared in the same manner as in Example 1 with the exception of sodium hydrogencarbonate being used as a plasticizer, instead of ammonium bicarbonate.

EXAMPLE 3

A lithium ion polymer battery was prepared in the same manner as in Example 1 with the exception of lithium hydrogencarbonate being used as a plasticizer, instead of ammonium bicarbonate.

EXAMPLE 4

A lithium ion polymer battery was prepared in the same manner as in Example 1 with the exception of potassium hydrogencarbonate being used as a plasticizer, instead of ammonium bicarbonate.

Comparative Example 50 g of $LiCoO_2$ and 10 g of carbon black were mixed, and 15 g of polyvinylidene fluoride, 400 g of acetone and 20 g of dibutyl phthalate were added thereto and then mixed sufficiently to prepare a cathode slurry composition.

The cathode slurry composition was cast on an expanded aluminum metal having a thickness of 50 μm and then dried at 50° C. to form a cathode plate.

50 g of graphite, 15 g of polyvinylidene fluoride, 400 g of acetone and 25 g of dibutyl phthalate were sufficiently mixed to prepare an anode slurry composition.

The anode slurry composition was cast on an expanded copper metal having a thickness of 50 μm, and then dried at 50° C. to form an anode plate.

A hybrid polymer electrolyte was prepared such that 60 g of polyvinylidene fluoride, 60 g of silica, 800 g of acetone and 100 g of dibutyl phthalate were mixed, cast on a polyethylene terephthalate (PET) film and dried at 50° C. for 5 minutes to prepare a polymer matrix. Subsequently, the polymer matrix was stripped off the PET film to prepare a polymer electrolyte.

The cathode plate, the polymer electrolyte and the anode plate were laminated, and then dried at 80° C. for 6 hours, thereby fabricating an electrode structure. Subsequently, the resultant was immersed in ether and dibutyl phthalate was extracted therefrom.

The electrode structure was immersed in the electrolytic solution, thereby completing a lithium ion polymer battery. Here, the electrolytic solution was prepared by dissolving $LiPF_6$ in a mixed organic solvent of ethylene carbonate and dimethyl carbonate.

The respective processes for preparing the lithium ion polymer batteries by Examples 1 through 4 and Comparative Example were compared and analyzed.

As a result, according to Examples 1 through 4, unlike the comparative example, since the plasticizer extraction step using ether was not necessary, the preparation process was kept clean. Also, the plasticizer is almost completely removed by thermal treatment, the process was facilitated and the preparation cost is reduced, compared to the comparative example.

High-rate charge and discharge characteristics of the lithium ion polymer batteries prepared by Examples 1 and comparative example were measured and demonstrated in the following Table.

TABLE

| Item | 0.5C discharging capacity (%)* | 2C discharging capacity (%)* | lifetime** (100th cycle) |
| --- | --- | --- | --- |
| Example 1 | 98 | 92 | 87 |
| Comparative Example | 90 | 87 | 85 |

*Discharging capacity is set to 100% based on 0.2C discharging
**initial discharging capacity is set to 100% on 1C discharging From the above Table, it can be understood that high-rate discharge characteristic of the lithium ion polymer battery prepared by Example 1 was improved, compared to that prepared by Comparative Example and lifetime characteristic of the lithium ion polymer battery prepared by Example 1 was at nearly the same level as that prepared by Comparative Example. Also, the lithium ion polymer batteries prepared by Examples 2 through 4 exhibited substantially the same results as those in Example 1.

As described above, since the lithium ion polymer batteries prepared by Examples 1 through 4 can fabricate electrode plates having fewer impurities due to a plasticizer, and uniform porosity structure, compared to that prepared by Comparative Example, the high-rate discharge characteristic is improved.

Since the pyrolytic plasticizer is used according to the present invention, the plasticizer extraction step applied in the conventional art is not necessary, thereby reducing the preparation cost and keeping a clean preparation process. In particular, after removing the plasticizer, a uniform porosity plate can be fabricated, thereby preparing a lithium ion polymer battery with improved high-rate charge and discharge characteristics.

What is claimed is:

1. An electrode active material composition for a lithium ion polymer battery having an electrode active material, a conductive agent, a plasticizer, a binder, and a deflocculation agent, wherein the plasticizer is a pyrolytic plasticizer and the content thereof is in the range of 5 to 30% by weight based on the total weight of the electrode active material composition.

2. The electrode active material composition for a lithium ion polymer battery of claim 1, wherein the pyrolytic plasticizer is ammonium bicarbonate, an alkali metal carbonate, or an alkali earth metal carbonate.

3. The electrode active material composition for a lithium ion polymer battery of claim 1, wherein the pyrolytic plasticizer is at least one selected from the group consisting of ammonium bicarbonate, sodium hydrogencarbonate ($NaHCO_3$), potassium hydrogencarbonate ($KHCO_3$), lithium hydrogencarbonate ($LiHCO_3$), lithium carbonate ($Li_2CO_3$), and calcium carbonate ($CaCO_3$).

4. The electrode active material composition for a lithium ion polymer battery of claim 1, wherein the deflocculation agent is sodium molybdate.

5. A polymer electrolyte matrix composition having a polymer resin, a plasticizer, and a deflocculation agent, wherein the plasticizer is a pyrolytic plasticizer and the content thereof is in the range of 10 to 60% by weight based on the total weight of the polymer electrolyte matrix composition.

6. The polymer electrolyte matrix composition of claim 5, wherein the pyrolytic plasticizer is ammonium bicarbonate, an alkali metal carbonate, or an alkali earth metal carbonate.

7. The polymer electrolyte matrix composition of claim 5, wherein the pyrolytic plasticizer is at least one selected from the group consisting of ammonium bicarbonate, sodium hydrogencarbonate ($NaHCO_3$), lithium hydrogencarbonate ($LiHCO_3$), potassium hydrogencarbonate ($KHCO_3$), lithium carbonate ($Li_2CO_3$), and calcium carbonate ($CaCO_3$).

8. The polymer electrolyte matrix composition of claim 5, wherein the deflocculation agent is sodium molybdate.

9. An electrode active material composition for a lithium ion polymer battery having an electrode active material, a conductive agent, a pyrolitic plasticizer, a binder, and a deflocculation agent, wherein the pyrolytic plasticizer is at least one selected from the group consisting of ammonium bicarbonate, sodium hydrogencarbonate ($NaHCO_3$), potassium hydrogencarbonate ($KHCO_3$), lithium hydrogencarbonate ($LiHCO_3$), and calcium carbonate ($CaCO_3$) and wherein the content of the pyrolytic plasticizer is in the range of 5 to 30% by weight based on the total weight of the electrode active material composition.

10. The electrode active material composition for a lithium ion polymer battery according to claim 9, wherein the deflocculation agent is sodium molybdate.

11. A polymer electrolyte matrix composition having a polymer resin, a pyrolytic plasticizer, and a deflocculation agent, wherein the pyrolytic plasticizer is at least one selected from the group consisting of ammonium bicarbonate, sodium hydrogencarbonate ($NaHCO_3$), lithium hydrogencarbonate ($LiHCO_3$), potassium hydrogencarbonate ($KHCO_3$), and calcium carbonate ($CaCO_3$), and wherein the content of the pyrolytic plasticizer is in the range of 10 to 60% by weight based on the total weight of the polymer electrolyte matrix composition.

12. The polymer electrolyte matrix composition according to claim 11, wherein the deflocculation agent is sodium molybdate.

* * * * *